United States Patent [19]
Pappa et al.

[11] Patent Number: 6,165,327
[45] Date of Patent: *Dec. 26, 2000

[54] PHOTOCATALYTIC PROCESS FOR THE PURIFICATION OF WATER POLLUTED BY ODORANT COMPOUNDS CONTAINING SULFUR

[75] Inventors: Rosario Pappa, Monterotondo; Edoardo D'Angeli, Rome, both of Italy

[73] Assignee: EniTecnologie S.p.A., San Donato Milanese, Italy

[ * ] Notice: This patent is subject to a terminal disclaimer.

[21] Appl. No.: 09/318,724

[22] Filed: May 26, 1999

[30] Foreign Application Priority Data

Jun. 4, 1998 [IT] Italy ................................. MI98/A1249

[51] Int. Cl.⁷ ........................................................ C02F 1/48

[52] U.S. Cl. ........................................ 204/158.2; 210/748

[58] Field of Search ..................................... 210/638, 748; 204/157.15, 157.2, 158.2

[56] References Cited

U.S. PATENT DOCUMENTS

| | | | |
|---|---|---|---|
| 4,861,484 | 8/1989 | Lichtin et al. | 210/638 |
| 4,863,608 | 9/1989 | Kawai et al. | |
| 5,501,801 | 3/1996 | Zhang et al. | |
| 5,689,798 | 11/1997 | Oeste. | |
| 6,027,654 | 2/2000 | Pappa et al. | 210/748 |

FOREIGN PATENT DOCUMENTS

| | | |
|---|---|---|
| 0 882 674 | 12/1998 | European Pat. Off. |
| WO 91/09823 | 7/1991 | WIPO. |
| WO 96/20017 | 7/1996 | WIPO. |

*Primary Examiner*—Kathryn Gorgos
*Assistant Examiner*—Thao Tran
*Attorney, Agent, or Firm*—Oblon, Spivak, McClelland, Maier & Neustadt, P.C.

[57] ABSTRACT

Process for the photocatalytic purification of waste water contaminated by odorant compounds containing sulfur, which can be applied to the purification of condensed water collected along the gas distribution network for domestic and industrial use.

5 Claims, No Drawings

PHOTOCATALYTIC PROCESS FOR THE PURIFICATION OF WATER POLLUTED BY ODORANT COMPOUNDS CONTAINING SULFUR

The present invention relates to a perfected process for the photocatalytic purification of water contaminated by odorant compounds containing sulfur.

Odorants, which are normally added to gas for domestic and industrial use to reveal accidental losses along distribution lines, are mixtures essentially consisting of mercaptans, among which ter butyl mercaptan is the most widely used, and stabilizers. Among the most widely known odorants on the market are those produced by Phillips Chemical Company under the name of Scentinel.

Collecting siphons of condensed water containing quantities of a few parts per million of odorant compound are installed along the gas transportation network. These siphons are occasionally emptied, recovering water with a characteristic, strong odour, due to the presence of the odorant agent condensed together with it. It is therefore necessary to carry out specific flushing treatment before discharge into the environment.

Among the various types of treatment possible, adsorption on activated carbon has the disadvantage of generating in turn an additional waste product consisting of the carbon itself impregnated with a badly-smelling material which must therefore be conveniently incinerated. There are also the typical disadvantages associated with the treatment of liquid streams on activated carbon beds.

Stripping with air is difficult to apply as the gaseous stream, if discharged into the air, would cause obvious drawbacks. It would in fact be necessary to collect the gaseous stream and to apply a further treatment to block the odorant agent.

Treatment with chemical oxidants, such as for example hypochlorite, on the one hand eliminates the odor of the water but it does not remove the presence of polluting compounds (normally characterized by a poor biodegradability) due to the oxidation of the original odorant agent.

A technique which is very frequently proposed for degrading water contaminated by organic compounds consists in the photodegradation of the contaminants by irradiation action, solar or U.V., operating in the presence of metal oxide catalysts of the semiconductor type. The treatment which takes place in the presence of oxygen, generally at room temperature, causes the "mineralization" of the contaminants, mineralization referring to the complete degradation of the toxic pollutant, with the formation of simple substances such as water, carbon dioxide and mineral acids.

Semiconductor metal oxides, such as for example titanium dioxide, are materials which have a particular electronic configuration: the valence band, at a lower energy level, is completely occupied by the electrons, whereas the conduction band, with a higher energy, is almost completely empty.

When this semiconductor is irradiated with energy photons higher than the "bandgap" (range between two bands), or equivalently with wave-length light lower than the "bandgap", there is the passage of electrons from the valence band to the conduction band, leaving an electronic deficiency in the valence band and consequently causing the formation of electron-gap couples. The electrons are transferred to the semiconductor/liquid interface and the interactions between the electrons and/or the photogenerated gaps, the species adsorbed to the surface of the semiconductor and the oxygen present in the system, are responsible for the degradation of the contaminants.

From a technical-environmental point of view, photocatalysis has, with respect to the more traditional technologies, the following advantages:

complete mineralization of a wide range of organic contaminants;

high separation efficiency at concentrations of the organic contaminant in the order of ppb;

absence of regenerative processes of the thermal type (as required for example by activated carbon) which often create problems of an environmental nature linked to gaseous emissions; and absence of microbic fouling phenomena typical of carbon filters.

We have now solved these problems with a photocatalytic process which allows odorant compounds containing sulfur to be degraded obtaining, in a simple and inexpensive way, odorless, unpolluted water without intermediate degradation products.

In accordance with this, the present invention relates to a process for the purification of condensed water collected along gas distribution lines for domestic and industrial use, contaminated by odorant mixtures, comprising the following steps:

dispersing in said condensed water solid particles of semiconductor metal oxide, having a size in the order of 0.5–3 microns, and in such a quantity that the concentration of said metal oxide ranges from 20 to 1000 ppm;

irradiating said dispersion, at room temperature, with U.V. light ranging from 150 to 420 nm for a time ranging from 20 to 150 minutes.

According to the present invention, a semiconductor metal oxide in the form of dispersed solid particles, is added, as catalyst, to the condensed water. Catalysts which can be used for the purpose are $ZnO$, $SnO_2$, $TiO_2$, $Fe_2O_3$, and $F_3O_4$. Titanium dioxide in its anatase crystalline form is the most preferred for its photocatalytic activity and stability under the operating conditions. The catalyst is conveniently in the form of particles of 0.5–3 microns, thus forming a good dispersion of the catalyst in aqueous phase. The concentration of the catalyst can generally vary from 20 to 1000 ppm and is preferably in the order of 50 ppm.

The dispersion of the catalyst in the polluted water is subjected to irradiation with ultraviolet light until the organic contaminant contained therein is completely degraded.

Radiation capable of activating a semiconductor catalyst, especially titanium dioxide, is ultraviolet radiation, especially near ultraviolet radiation (300–400 nm). Radiation sources normally used are therefore mercury arc lamps (at high, medium or low pressure), or xenon lamps, which emit within the U.V. range. These devices are available on the market.

Elongated cylindrically-shaped photochemical reactors are conveniently used, in which a tubular UV lamp is inserted, along the greater axis of the reactor, thus obtaining the highest possible quantic yield. According to an embodiment of the invention, the suspension is continuously circulated between the container tank and photochemcial reactor.

In any case the operating temperature is room temperature or temperatures close to room temperature.

When operating according to the process of the present invention, the times for the complete, or almost complete degradation of the ter butyl mercaptan contained in the odorant mixture, are within the range of 20–150 minutes.

At the end of the process the ter butyl mercaptan is eliminated in a simple and economic way, obtaining a completely deodorized water without organic pollutant which has been completely transformed into carbon dioxide and sulfate ion.

The following experimental examples provide a better illustration of the present invention.

EXAMPLE 1

400 ppm of anatase crystalline titanium dioxide (Degussa P25), in the form of particles having a size of 0.5–3 microns, are added to a sample of condensed water collected from appropriate flushing siphons along a methane distribution line and containing 1000 ppb of ter butyl mercaptan (TBM). The dispersion is stirred in the photocatalytic reactor consisting of a 400 ml glass container in which a low pressure, mercury vapour UV lamp having a power of 125W, is immersed. The container is hermetically closed, with the UV lamp switched off. An initial sample of the dispersion is taken and analyzed by means of a gas chromatograph connected to a mass spectrometer. Additional samples of the dispersion are removed after one and two hours of stirring of the dispersion at room temperature with the UV lamp off. The analytic results do not show any variation in the initial concentration of the mercaptan present in the decontaminated water.

EXAMPLE 2

A second sample of water, identical to that used in example 1 but without titanium dioxide, is charged into the photoreactor and illuminated with a UV lamp immersed therein. The dispersion is stirred, the temperature being maintained at values close to room temperature by means of water circulation in an appropriate cooling jacket around the UV lamp. Samples of the dispersion are removed at time zero (lamp off) and after 15, 30 and 60 minutes of irradiation.

Analysis by means of gas chromatography—mass spectrometry indicates, after 60 minutes, a reduction in the initial concentration of the TMB of about 20% with the formation of intermediate compounds not well identified.

The water discharged from the photoreactor at the end of the experiment still has the characteristic smell of the odorant compound.

EXAMPLE 3

400 ppm of titanium dioxide Degussa P25 are added to a third sample of water, identical to that used in the previous examples, which is charged into the photoreactor described above. The dispersion is stirred at room temperature. After removing an initial sample, the UV lamp is switched on, the temperature of the dispersion being maintained at values close to room temperature by means of water cooling, as effected in the previous examples. Further samples of the dispersion are removed after 15, 30 and 60 minutes and analyzed by means of gas mass under the same conditions as the previous examples. After only 15 minutes of irradiation, there is no sign of either the presence of TMB or the intermediate products observed in example 2, and not even any traces considering the extreme sensitivity of the analytical instrument. After 15 minutes the sample no longer has the typical smell of thioeter.

EXAMPLE 4

Example 3 is repeated, using a smaller quantity of titanium dioxide, equal to 50 ppm instead of 400. After 15 minutes of irradiation the concentration of TMB is equal to about a tenth of the initial concentration and after 30 minutes there are no traces of either the starting ter butyl mercaptan or the intermediate products observed in test 2.

What is claimed is:

1. Process for the purification of condensed water along gas distribution lines for domestic and industrial use, contaminated by odorant mixtures, comprising the following steps:

dispersing in said condensed water solid particles of semiconductor metal oxide, having a size in the order of 0.5–3 microns, and in such a quantity that the concentration of said metal oxide ranges from 20 to 1000 ppm;

irradiating said dispersion, at room temperature, with U.V. light ranging from 150 to 420 nm for a time ranging from 20 to 150 minutes.

2. The process according to claim 1 characterized in that the odorant mixture contains ter butyl mercaptan.

3. The process according to claim 1 characterized in that the semiconductor oxide is titanium dioxide.

4. The process according to claim 1 characterized in that the semiconductor oxide is dispersed in a quantity of 50 ppm.

5. The process according to claim 1 characterized in that the ultraviolet radiation ranges from 300 to 400 nm.

* * * * *